United States Patent [19]
Nakama

[11] Patent Number: 4,778,320
[45] Date of Patent: Oct. 18, 1988

[54] FASTENER FOR COUPLING TOGETHER TWO PANELS IN FACE-TO-FACE RELATION

[75] Inventor: Daiji Nakama, Yokohama, Japan

[73] Assignee: Nifco, Inc., Yokohama, Japan

[21] Appl. No.: 876,998

[22] Filed: Jun. 19, 1986

[30] Foreign Application Priority Data

Jul. 15, 1985 [JP] Japan ................................ 60-154146

[51] Int. Cl.[4] ................................................ F16B 21/06

[52] U.S. Cl. ........................................ 411/509; 24/297; 24/662

[58] Field of Search ............... 411/509, 510, 508, 500, 411/44, 45, 57, 60, 182; 24/662, 453, 297, 573

[56] References Cited

FOREIGN PATENT DOCUMENTS 56-31444 7/1981 Japan .

*Primary Examiner*—Lloyd A. Gall
*Attorney, Agent, or Firm*—Trexler, Bushnell, Giangiorgi & Blackstone, Ltd.

[57] ABSTRACT

A fastener comprises two, i.e. male and female, members. The female member has a hollow locking body portion, reinforcement portions projecting from the outer periphery of the locking body portion, and diametrically opposed elastic locking pawl portions extending in a substantially V-shaped fashion from the free end of the reinforcement portions toward the lower surface of a top mounting flange. The locking pawl portions face each other on the opposite sides of the locking body portion and each has a substantially arcuate sectional profile. The male member is fitted in one of two panels and detachably coupled to the female member fitted in the other panel.

3 Claims, 2 Drawing Sheets

3a 3c 3 3b A 5 B 11 11 8 6 7 9 7 2

FASTENER FOR COUPLING TOGETHER TWO PANELS IN FACE-TO-FACE RELATION

FIELD OF THE INVENTION AND RELATED ART STATEMENT

This invention relates to a fastener which consists of two, i.e. male and female, plastic members and can be effectively used for coupling together two panels, i.e. an interior trim board of a car passenger compartment and a car body panel, in a face-to-face relation to each other.

A fastener for coupling together two panels is disclosed in Japanese Patent Publication No. SH 56-31444 and has been used in practice.

To couple together two panels with the disclosed fastener, the male member is fitted in one of the panels by inserting its head portion consisting of two, i.e. main and auxiliary, flanges into a mounting hole formed in the panel. The female member is fitted in the other panel by forcibly inserting its locking body portion into a mounting hole formed in the panel until is mounting flange strikes the panel. Afterwards, the two members are coupled together by inserting a locking shaft portion of the male member into the locking body portion of the female member, whereby the two panels are coupled together in a face-to-face relation to each other.

In the above structure of the disclosed fastener, the female member is fitted in the mounting hole of the panel with its locking pawl portions provided of the outer periphery of the locking body portion hooked on the edge of the mounting hole. When the female member is inserted through the mounting hole, however, either the locking pawl portions are deformed to reduce the overall outer dimension or the locking body portion is inwardly flexed by making use of the elasticity of the material. Therefore, the female member has to be inserted with a considerably strong force when it is fitted in the panel.

Further, the locking pawl portions are provided directly on the outer periphery of the locking body portion. Therefore, when the female member is inserted through the mounting hole, the locking body portion is more or less contracted. Therefore, the force of coupling between a locking shaft portion of the male member and a locking body portion of the female member is subject to variations, that is, it is difficult to obtain uniform coupling between the male and female members. Further, the mounting force, with which the members are fitted in the panels, is subject to fluctuations.

OBJECT AND SUMMARY OF THE INVENTION

The invention seeks to improve the stability of the mounting property of the female member of the fastener and the stability of the coupling force, with which the male and female members are coupled together.

An object of the invention is to provide a fastener for coupling together two panels in a face-to-face relation to each other, which is improved in the property of insertion of the female member into a mounting hole of a panel to improve the mounting property, particularly permitting the fitting in a panel with a reduced inserting force, and can provide a strong locking force compared to the inserting force once the member is fitted so that a stable mounted state can be obtained.

To attain the above object of the invention, there is provided a fastener comprising two, i.e. male and female, members, in which the outer periphery of a hollow locking body portion of the female member is provided with integral reinforcement portions extending in the longitudinal direction, the reinforcement portions being like a plate as a whole and having a tapering end, and the female member is also provided with a pair of diametrically opposed elastic locking paw portions extending in a V-shaped fashion from the tapering end of the reinforcement portions toward the lower end of a mounting flange, the locking pawl portions facing each other on the opposite sides of the locking body portion and each having a substantially arcuate sectional profile and also having an inwardly bent V-shaped free end portion. The fastener can be effectively utilized for securing a trim board to a car passenger compartment wall surface.

To couple together two panels with the fastener, the male member is fitted in one of the panels by inserting its head portion having two flanges into a mounting hole like a key hole formed in the panel. The female member is fitted in the other panel by forcibly inserting its locking body portion into a mounting hole formed in the other panel until its mounting flange strikes the panel surface. By so doing, the pair elastic locking pawl portions extending from the free end of the reinforcement portions are hooked on the edge of the mounting hole to lock the female member. In this state, the two members are coupled together by forcibly inserting the locking body portion of the male member in the locking body portion of the female member, thus coupling together the two panels.

The locking shaft portion and locking body portion are coupled together independently of and without being influenced by the fitting of the male member in the mounting hole of the panel. When the locking body portion of the female member is forcibly inserted into the mounting hole of the panel, the outwardly extending elastic locking pawl portions are inwardly flexed. After the female member has been inserted up to a position corresponding to the maximum overall transverse dimension of the locking pawl portions, the succeeding portions thereof receive a repulsive force and slide against the edge of the mounting hole to guide the locking body portion in the direction of insertion to promote the inserting force. Further, with this guidance, the female member is click fitted in the mounting hole, so that the operator can feel that the fitting of the member is completed.

The above and other objects and features of the invention will become more apparen from the following detailed description with reference to the accompanying drawings.

DETAILED DESCRIPTION OF THE PREFERRED EMBODIMENT

Figure 1:
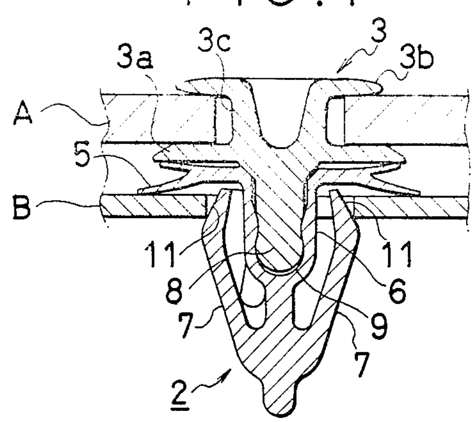
FIG. 1 is an axial sectional view showing an embodiment of the fastener according to the invention stably coupling together two panels.
Figure 2:
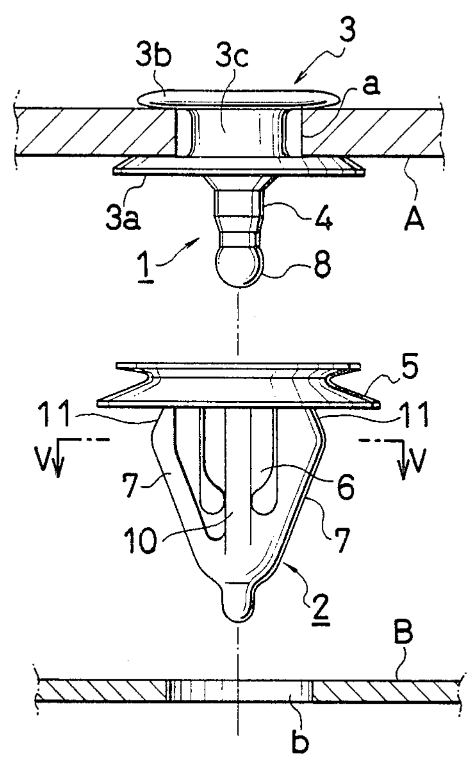
FIG. 2 is a front view, partly in section, with male and female members shown separately before being coupled together.
Figure 3:
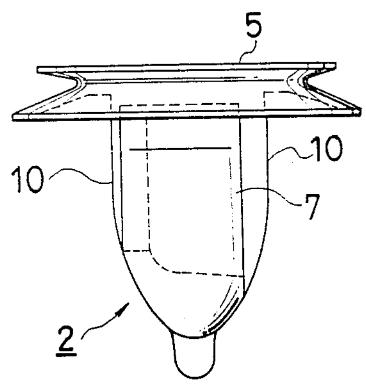
FIG. 3 is a side view showing the female member.
Figure 4:
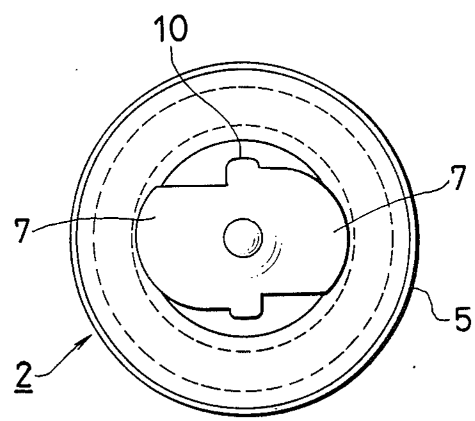
FIG. 4 is a bottom view showing the female member.

Referring now to the Figures illustrating an embodiment of the invention, the fastener comprises a male member 1 and a female member 2. These members 1 and 2 are separate plastic moldings. In the instant case, they are molded from a polyethylene resin. The male member 1 has a head portion 3 and a locking shaft portion 4. The female member 2 has a flange portion 5, a locking body portion 6 and elastic locking pawl portions 7.

The head portion 3 of the male member 1 has a large flange 3*a*, a small flange 3*b* and a neck 3*c* between the flanges 3*a* and 3*b*. The shaft portion 4 depends from the center of a lower surface of the head portion. It has a substantially spherical end 8.

The male member is secured to a panel A, e.g. a trim board, by forcing the head portion 3 into a mounting hole a which is formed in advance in the panel A. The mounting hole a is like a key hole consising of two, i.e. large and small, sections. To fit the male member in the mounting hole a, the small flange 3*b* of the head portion is first inserted through the large diameer section (not shown) of the mounting hole. When the large flange 3*a* is brought into contact with the panel surface, the head portion is shifted to the small section of the mounting hole to bring the small flange 3*b* into contact with the other surface of the panel. Thus, the panel A is clamped between the large and small flanges of the male member secured to the panel. This method of securement is the same as for fasteners which have already been proposed, and is presently extensively practiced.

The locking body portion 6 of the female member 2 has a blind space open at one end, and it has a mounting flange 5 outwardly extending from the end of the outer periphery at the open end of the blind space.

The blind space of the locking body portion 6 has a size sufficient to receive the locking shaft portion 4 of the male member. The blind space has a substantially spherical bottom 9, in which the substantially spherical end 8 of the shaft portion 4 of the male member is received. The locking body portion 6 has diametrically opposed reinforcement portions 10 projecting from the outer periphery and extending in the length direction. The reinforcement portions 10 have a predetermined thickness. The reinforcement portions 10 as a whole is like a plate tapering toward the free end, from which a pair of elastic locking pawl portions 7 extend.

The mounting flange 5 consists of two, i.e. upper and lower, flanges, the lower flange being bevel-like to enhance the seal property. The locking body portion 6 depends from the center of the mounting flange 5.

The diametrically opposite reinforcement portions 10 divide the locking body portion into two sections. Their overall width dimension is slightly smaller than the diameter of a circular mounting hole b formed in a panel B.

Each of the elastic locking pawl portions 7 extending from the end of the reinforcement portions 10 has a substantially arcuate sectional profile and extends obliquely toward the lower surface of the mounting flange 5 such that the locking body portion 6 is surrounded by the two locking pawl portions 7. Each locking pawl portion has an inwardly bent V-shaped end portion 11.

Figure 5:
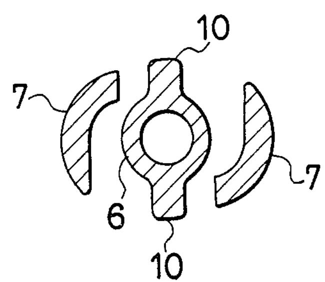
FIG. 5 is a sectional view taken along line V—V in FIG. 2.

As shown in FIG. 5, the overall width dimension of the pair of elastic locking pawl portions 7 is normally greater than the diameter of the mounting hole b formed in the panel B.

With the fastener of the above construction according to the invention, the panels A and B are secured together by securing the head portion 3 of the male member 1 in the mounting hole a of the panel A, securing the female member 1 to the other panel B by inserting it into the mounting hole b to be locked therein by the locking pawl portions 7, and then forcibly inserting the locking shaft portion 4 of the male member in the locking body portion 6 of the female member and thus causing the substantially spherical end 8 of the locking shaft portion to be engaged in the substantially spherical bottom 9 of the blind space of the female member. To release the panels from the secured state the male member is pulled to cause disengagement of the end 8 from the bottom 9.

As has been shown, according to the invention two panels can be secured together by forcibly inserting the locking shaft portion 4 of the male member into the blind space in the locking body portion 6 of the female member. Particularly, according to the invention the elastic locking pawl portions 7, which serve as locking means for locking the female member to a panel, are formed such that they have an arcuate sectional profile so that they can provide high repulsive force. In addition, they each have an inwardly bent V-shaped end portion. Thus, after the locking pawl portions have been inserted up to the position corresponding to the maximum overall outer dimension, the inclined surfaces of the V-shaped end portions which engage with the edge of the mounting hole will induce further insertion of the locking pawl portions in co-operation with the repulsive force enhanced with the contraction of the overall outer dimension of the locking pawl portions, thus promoting quick fitting of the female member. Further, with this positive lead-in action, the female member can be click fitted in the mounting hole, allowing the operator's finger tip to sense that the member has been fitted. This is very advantageous from the standpoint of the operation efficiency in case where a trim board or the like is secured using a large number of fasteners since the completion of fitting of each fastener can be recognized when it is forcively inserted.

Of course, with the fastener according to the invention the elastic locking pawl portions of the female member have an arcuate sectional profile and a sufficient size to provide a high repulsive force, so that they provide a high locking force and will not be detached or broken by the edge of the mounting hole when the male member is separated from the female member. Further, in addition to the high locking force provided at the time of the fitting of the female member in the mounting hole, the locking pawl portions can be sufficiently flexed to reduce the overall outer transverse dimension while receiving the locking body portion in their arcuate inner surface. Thus, a sufficient thickness can be ensured to provide a high locking force.

Further, with the fastener according to the invention, the elastic locking pawl portions of the female member extend from the locking body portion via the reinforcement portions and provide an action independent of the locking body portion; that is, they have no influence on the coupling and decoupling of the locking shaft portion of the male member and locking body portion of the female member. Thus, the two members, and hence the panels, in which the members are fitted, can be reliably and stably coupled and decoupled. Further, in the manufacture of the fastener it is necessary to pay attention to only the engagement portions of the locking shaft and body portions and the dimensional precision of the engagement portions. The fastener according to the invention thus has excellent manufacturability.

The above embodiment of the invention has been described in conjunction with a method of coupling together the two panels A and B by preliminarily fitting the male and female members 1 and 2 in these panels. It is also possible to couple together the two panels by preliminarily coupling together the male and female members, then fitting the head portion of the male member in the mounting hole a of one panel and forcibly inserting the female member into the mounting hole b of the other panel.

This method of preliminarily coupling together the two, i.e. male and female, members is advantageous from the standpoint of product management. Besides, by merely forcing one panel, a large number of female members can be fitted in the other panel. Further, in a small operating space the panel A can be installed without need of extending the hand into the small space but by merely forcing the panel. Further, in the case of the method of preliminarily coupling together the two members, the elastic locking pawl portions 7 of the female member are flexed as the female member is inserted through the mounting hole b independently of and without at all influencing the locking body portion 6, in which the locking shaft portion 4 is received. Thus, the female member can be fitted very smoothly just as in the case where it is fitted alone.

What is claimed is:

1. A fastener for coupling together two panels in a face-to-face relation to each other comprising a male member to be fitted in one of said panels and a female member to be fitted in the other one of said panels, said male member having a head portion to be fitted in a mounting hole of said one panel and a locking shaft portion depending from the lower surface of said head portion, said female member having a mounting flange for regulating the extent of insertion into a mounting hole in said other panel, a hollow locking body portion depending downwardly from said mounting flange and having a blind space and locking means to be locked with respect to said mounting hole, said two members being coupled together to couple together said two panels in face-to-face relation to each other, said female member having reinforcement portions projecting from the outer periphery of diametrically opposite sides of said locking body portion and extending substantially from said mounting flange in the longitudinal direction of and axially beyond said locking body portion, said reinforcement portions being like a flat plate as a whole and having a tapering end axially beyond said locking body portion, and elastic locking pawl portions extending as a pair reversely from junctions axially beyond said locking body portion with opposite sides of said tapering end of said reinforcement portions toward said mounting flange and being laterally spaced from and substantially flexibly yieldable relative to said locking body portion and independent thereof, and said pawl portions each having a substantially arcuate sectional profile and presenting opposite free longitudinally extending edges, said elastic pawl portions each having an inwardly bent V-shaped free end portion having an inclined outer surface.

2. The fastener according to claim 1, wherein said head portion of said male member has an upper small diameter flange and a lower large diameter flange.

3. The fastener according to claim 1, wherein said locking shaft portion has a substantially spherical end, and said blind space of said hollow locking body portion has a substantially spherical bottom, said substantially spherical end being engaged in said substantially spherical bottom.

* * * * *